May 20, 1952      L. E. THOMPSON      2,597,408
ELECTRIC MOTOR CONTROL
Original Filed March 31, 1947
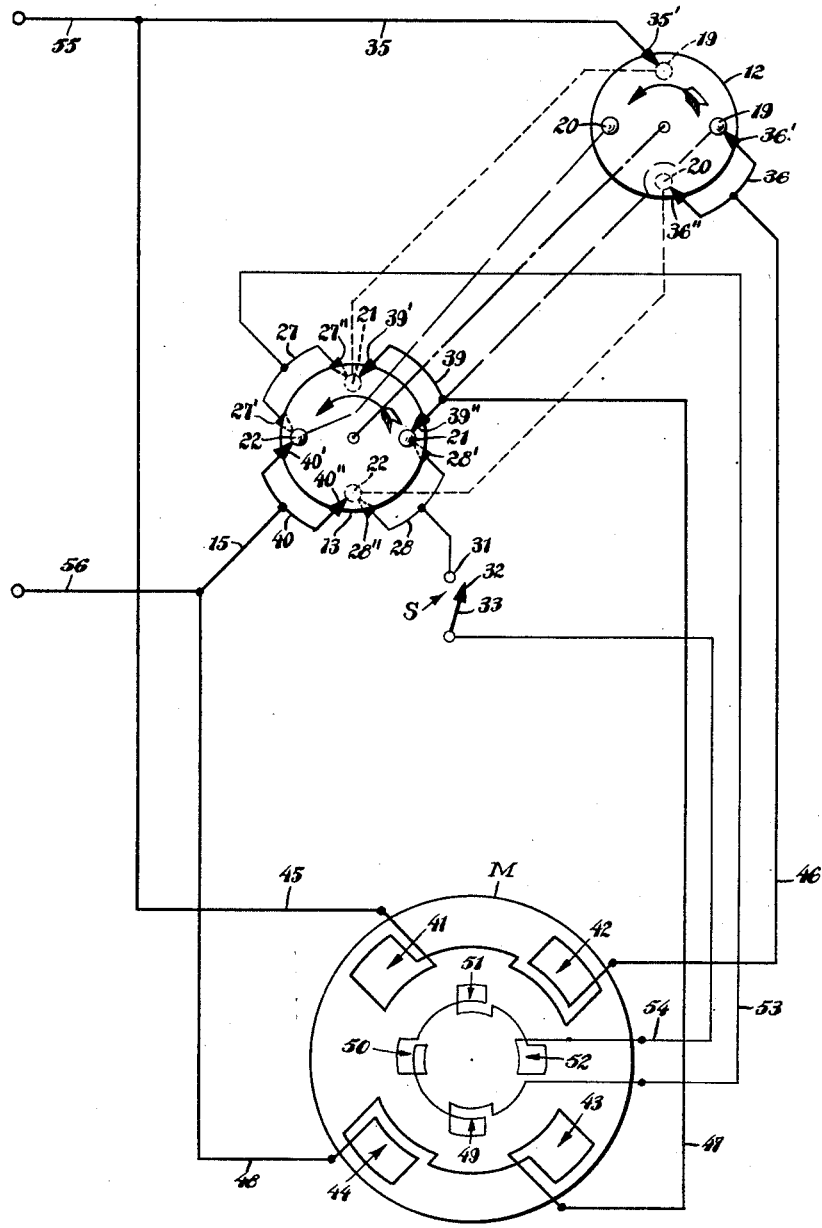
INVENTOR.
LAWRENCE E. THOMPSON,
BY:
*Harold B Hood.*
ATTORNEY.

Patented May 20, 1952

2,597,408

UNITED STATES PATENT OFFICE 2,597,408

ELECTRIC MOTOR CONTROL

Lawrence Emanuel Thompson, Marion, Ind.

Original application March 31, 1947, Serial No. 738,394. Divided and this application January 18, 1949, Serial No. 71,491

1 Claim. (Cl. 318—207)

This is a division of my co-pending application Serial Number 738,394, filed March 31, 1947, for Electric Switch, now Patent 2,466,133 issued April 5, 1949.

The primary object of the present invention is to provide, in combination with a reversible electric motor, safely manipulable switch means for selecting either of two motor energizing potentials and for reversing the polarity of the voltage impressed on the starting winding of the motor.

The common expedient, well known to the art, to accomplish the above-mentioned objects is a control box which is used in association with a reversible electric motor. This control box comprises, essentially, a number of bus bars and wires so interchangeably arranged that the proper manual adjustment of them will effect the desired circuit changes. The said bars are usually held in place by means of terminal bolts and are provided with end slots to facilitate their being clamped in the proper positions. Obviously, this switching means is clumsy and cumbersome necessitating much time and effort to effect the desired changes, and furthermore, the commonly available sources of electric power are of sufficient magnitude to cause serious injury or death to any person coming into contact therewith; and since the bus bars and wires are exposed and must be handled by the operator, a very undesirable feature of danger presents itself, unless the control box and motor are preliminarily disconnected from the power supply which is unnecessary with my switch.

My invention obviates the manual handling of the bus bars and wires to effect desired circuit changes thereby overcoming the above-mentioned undesirable and dangerous features of the old switching system. By merely turning a knob, a 110 or 220 volt source of voltage may be applied to the electric motor as desired, and by merely turning another knob on the same switch the direction of rotation of said motor may be changed.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

The single figure is a schematic illustration of a reversible electric motor and rotary switch means associated therewith through suitable circuits to accomplish the above-stated objectives.

Two rotary discs 12 and 13 of dielectric material are mounted upon a common axis and in substantial contact with each other. The disc 12 carries diametrically opposed conductive buttons 19 and 20, while the disc 13 carries similar buttons 21 and 22 similarly disposed. Bridge pieces 27 and 28 are mounted adjacent the discs, the bridge piece 27 having spaced but electrically connected contactors 27' and 27" projecting beneath the disc 13 and spaced approximately 90° from each other for alternative contact with the buttons 22 and 21 which project beyond the opposite faces of the disc 13; and the bridge piece 28 is provided with similarly projecting contactors 28' and 28" for similar contact with the buttons 21 and 22.

Intermediate the positions of the bridge pieces 27 and 28 are mounted two other bridge pieces 39 and 40. Contactors 39' and 39", spaced approximately 90° apart but electrically connected to each other, project into the space between the discs 12 and 13 for alternative contact by the button 21 on the disc 13 and by the button 19 on the disc 12. The bridge piece 40 is provided with similar contactors 40' and 40" for alternative contact by the button 22 and by the button 20.

A wire 35 leads from line wire 55 to a contactor 35' adapted, in one position of the disc 12, to contact the button 19. A bridge piece 36 is provided with contactors 36' and 36" for alternative contact by the buttons 19 and 20.

A wire 45 leads from line wire 55 to one side of the series-connected field coils 41 and 42 of a reversible electric motor M. A wire 46 connects the other side of said coils with the bridge piece 36.

A wire 48 leads from line wire 56 to one side of series-connected field coils 44 and 43 of the motor M; and the other side of said coils is connected by wire 47 with bridge piece 39.

Starting coils 49, 50, 51 and 52 are connected in series, one side of the series being connected by wire 53 with bridge piece 27 and the other side being connected by wire 54 with one side of a starting switch S, the other side of said switch being connected to bridge piece 28. A wire 15 connects the bridge piece 40 with line wire 56.

With the parts in the positions illustrated, but with switch arm 33 moved to bring its contact point 32 into engagement with contact 31, the starting windings will be energized through a circuit leading from line wire 55 through wire 45, field coils 41 and 42, wire 46, bridge piece 36, contactor 36', button 19, button 21, which is now in engagement with button 19, contactor 28', bridge piece 28, starting switch S, wire 54, starting coils 52, 51, 50 and 49, wire 53, bridge piece 27, contactor 27', button 22, contactor 40', bridge piece 40, and wire 15 to line wire 56. At the same time, a driving circuit in which the field coils 43 and 44 are connected in series with the field coils 41 and 42 is established from line wire 55 through wire 45, coils 41 and 42, wire 46, bridge piece 36, contactor 36', button 19, contactor 39'', with which said button 19 is now in contact, bridge piece 39, wire 47, coils 43 and 44, and wire 48 to line wire 56. Under these conditions, of course, a potential of 220 volts can be applied to the system, since the coils 41, 42, 43 and 44 are connected in series.

If, now, it is desired to drive the motor M in the opposite direction, the disc 13 may be rotated in a counter-clockwise direction to bring its buttons 21 and 22 into the positions illustrated in dotted lines in the drawing. Now, when the switch S is closed, a starting circuit will flow from line wire 55 through wire 45, coils 41 and 42, wire 46, bridge piece 36, contactor 36', button 19, contactor 39'', bridge piece 39, contactor 39', button 21, contactor 27'', bridge piece 27, wire 53, starting coils 49, 50, 51 and 52, wire 54, switch S, bridge piece 28, contactor 28'', button 22, contactor 40'', bridge piece 40, and wire 15 to line wire 56. At the same time, the previously-traced circuit through the field windings 41, 42, 43 and 44 in series will be maintained.

Leaving the disc 13 in the last-mentioned position of adjustment, the disc 12 may be rotated through 90° in a counter-clockwise direction to bring its buttons 19 and 20 into the positions illustrated in dotted lines. Now, the starting circuit will be traced from line wire 55 through wire 35, contactor 35', button 19, which now engages said contactor, button 21, likewise engaged by button 19, contactor 27'', engaged by button 21, bridge piece 27, wire 53, starting coils 49, 50, 51 and 52, wire 54, switch S, bridge piece 28, contactor 28'', button 22, contactor 40'', bridge piece 40, and wire 15 to line wire 56. At the same time, the field windings 41 and 42 and the field windings 43 and 44 are connected in parallel circuits as follows: line wire 55, wire 45, coils 41 and 42, wire 46, bridge piece 36, contactor 36'', button 20, contactor 40'' with which button 20 is now in contact, bridge piece 40, and wire 15 to line wire 56; and line wire 55, wire 35, contactor 35', button 19, contactor 39' with which said button now engages, bridge piece 39, wire 47, windings 43 and 44, and wire 48 to line wire 56. Current at 110 volts will now be applied to the system.

If the disc 12 is left in its dotted-line position and the disc 13 is returned to its solid-line position, the starting circuit will be traced from line wire 55 through wire 35, contactor 35', button 19, contactor 39', bridge piece 39, contactor 39'', button 21, contactor 28', bridge piece 28, switch S, wire 54, starting coils 52, 51, 50 and 49, wire 53, bridge piece 27, contactor 27', button 22, contactor 40', bridge piece 40, and wire 15 to line wire 56. This manipulation of the disc 13 will, of course, reverse the direction of operation of the motor M, without affecting the parallel circuits through which the respective pairs of field windings of the motor are energized as described above.

I claim as my invention:

In combination, a reversible electric motor having two field windings and a starter winding, switch means electrically connected to said windings, said switch means comprising a first element carrying spaced, electrically-separated contacts, a second element carrying spaced, electrically-separated contacts, said elements being mounted for independent rotary movement about a common axis and said contacts projecting from said elements for mutual engagement upon registry, a conductor for electrically connecting one side of one field winding with one side of a source of electrical energy, a second conductor for electrically connecting one side of the other field winding with the other side of said source, means electrically connecting the other side of said one field winding with contact means alternatively engageable by said contacts on said first element, means electrically connecting the other side of said other field winding with contactors alternatively engageable by one of said contacts on said second element, means electrically connecting said one side of said source with a contactor engaged by one of said contacts carried by said first element when the other contact carried by said first element engages said first-named contact means, means electrically connecting one side of said starter winding with contact means alternatively engageable by said contacts carried by said second element, means electrically connecting the other side of said starter winding with contact means alternatively engageable by said contacts carried by said second element, said last-named connecting means including a switch, and a conductor for connecting the other side of said source with contactors alternatively engageable by the other of said contacts carried by said second element.

LAWRENCE EMANUEL THOMPSON.

REFERENCES CITED

The following references are of record in the file of this patent:

UNITED STATES PATENTS

| Number | Name | Date |
|---|---|---|
| 1,315,965 | Jennings | Sept. 16, 1919 |
| 2,024,726 | Ehrenfeld | Dec. 17, 1935 |
| 2,084,058 | Lyden | June 15, 1937 |
| 2,145,616 | Waterworth | Jan. 31, 1939 |